United States Patent
Someya

(10) Patent No.: US 11,992,932 B2
(45) Date of Patent: May 28, 2024

(54) ROBOT CONTROLLER, ROBOT SYSTEM, AND ROBOT CONTROL METHOD

(71) Applicant: Fanuc Corporation, Yamanashi (JP)

(72) Inventor: Makoto Someya, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 712 days.

(21) Appl. No.: 16/868,746

(22) Filed: May 7, 2020

(65) Prior Publication Data

US 2020/0368917 A1    Nov. 26, 2020

(30) Foreign Application Priority Data

May 20, 2019    (JP) ................. 2019-094485

(51) Int. Cl.
| | |
|---|---|
| B25J 13/00 | (2006.01) |
| B25J 9/00 | (2006.01) |
| B25J 9/16 | (2006.01) |
| B25J 13/06 | (2006.01) |
| H04L 43/0852 | (2022.01) |
| H04W 24/08 | (2009.01) |

(52) U.S. Cl.
CPC .......... *B25J 13/006* (2013.01); *B25J 9/0081* (2013.01); *B25J 9/1674* (2013.01); *B25J 13/06* (2013.01); *H04L 43/0852* (2013.01); *H04W 24/08* (2013.01)

(58) Field of Classification Search
CPC ...... B25J 13/006; B25J 9/0081; B25J 9/1674; B25J 13/06; B25J 19/06; B25J 9/161; B25J 9/1689; H04L 43/0852; H04L 43/0858; H04W 24/08; H04W 24/04; H04W 84/18; G05B 2219/33192; G05B 2219/33274
See application file for complete search history.

(56) References Cited

U.S. PATENT DOCUMENTS

| | | | |
|---|---|---|---|
| 8,412,379 B2 | 4/2013 | Gerio et al. | |
| 9,321,178 B2 | 4/2016 | Cho et al. | |
| 10,434,666 B2* | 10/2019 | Katayama | ................ B25J 19/06 |
| 2016/0109883 A1* | 4/2016 | Sim | ....................... G05D 1/0282 |
| | | | 701/23 |
| 2017/0285625 A1* | 10/2017 | Sato | ....................... B25J 9/1633 |
| 2019/0061155 A1 | 2/2019 | Hashimoto et al. | |
| 2019/0063907 A1* | 2/2019 | Grau | ......................... G06T 7/55 |
| 2019/0070730 A1* | 3/2019 | Morioka | ................ B25J 9/1666 |
| 2020/0039082 A1* | 2/2020 | Kapoor | ..................... B25J 13/06 |

(Continued)

FOREIGN PATENT DOCUMENTS

| | | |
|---|---|---|
| JP | 11188687 A | 7/1999 |
| JP | 2004314255 A | 11/2004 |

(Continued)

*Primary Examiner* — Sohana Tanju Khayer

(74) *Attorney, Agent, or Firm* — Buchanan, Ingersoll & Rooney PC

(57) ABSTRACT

A robot controller for controlling a robot includes a reception unit configured to receive, by wireless communication, transmission data containing an operation command for the robot, a delay detection unit configured to detect a delay of the received transmission data from a scheduled arrival time, and a speed setting unit configured to set, when the delay is detected, a movement speed when the robot moves in accordance with the operation command to a 2nd speed which is less than a 1st speed set when the delay is not detected and which is greater than zero.

6 Claims, 7 Drawing Sheets

(56) References Cited

U.S. PATENT DOCUMENTS

| | | | |
|---|---|---|---|
| 2020/0368909 A1* | 11/2020 | Sejimo | B25J 9/1676 |
| 2021/0016438 A1* | 1/2021 | Pivac | B25J 13/08 |
| 2021/0086374 A1* | 3/2021 | Brandt | B25J 9/1664 |
| 2022/0224498 A1* | 7/2022 | Cha | H04L 5/0051 |

FOREIGN PATENT DOCUMENTS

| | | | |
|---|---|---|---|
| JP | 2010149273 A | 7/2010 |
| JP | 2015020215 A | 2/2015 |
| JP | 2015163416 A | 9/2015 |
| JP | 2018107568 A | 7/2018 |
| JP | 2019038065 A | 3/2019 |

\* cited by examiner

ROBOT CONTROLLER, ROBOT SYSTEM, AND ROBOT CONTROL METHOD

CROSS-REFERENCE TO RELATED APPLICATIONS

This application is a new U.S. Patent Application that claims benefit of Japanese Patent Application No. 2019-094485, dated May 20, 2019, the disclosure of which is incorporated herein by reference in its entirety for all purposes.

BACKGROUND OF THE INVENTION

1. Field of the Invention

The present invention relates to a robot controller, a robot system, and a robot control method.

2. Description of Related Art

In recent years, robot systems in which an operation input device for performing operation input to a robot and a robot controller are wirelessly connected have been proposed. Japanese Unexamined. Patent Publication (Kokai) No. 2015-020215A describes a robot control system in which a hand guide device as an operation input device is wirelessly connected to a controller and a monitoring device.

SUMMARY OF THE INVENTION

In wireless communication, the communication situation may be degraded due to the influence of the surrounding environment in some cases. When the wireless communication situation is degraded in a robot system in which an operation input device and a robot controller are wirelessly connected, as described above, transmission data from the operation input device may be delayed and may not reach the robot controller for a certain period of time. Though the robot controller generally stops the robot in such a case, stoppage of the robot during a teaching operation reduces the efficiency of the entire teaching operation.

An aspect of the present disclosure provides a robot controller for controlling a robot, the robot controller comprising a reception unit configured to receive, by wireless communication, transmission data containing an operation command for the robot, a delay detection unit configured to detect a delay of the received transmission data from a scheduled arrival time, and a speed setting unit configured to set, when the delay is detected, a movement speed of the robot which is moved in accordance with the operation command to a 2nd speed which is less than a 1st speed set when the delay is not detected and which is greater than zero.

BRIEF DESCRIPTION OF DRAWINGS

The object, characteristics, and advantages of the present invention will be elucidated by the following explanation of the embodiments in association with the attached drawings. In the attached drawings.

DETAILED DESCRIPTION

Figure 1:
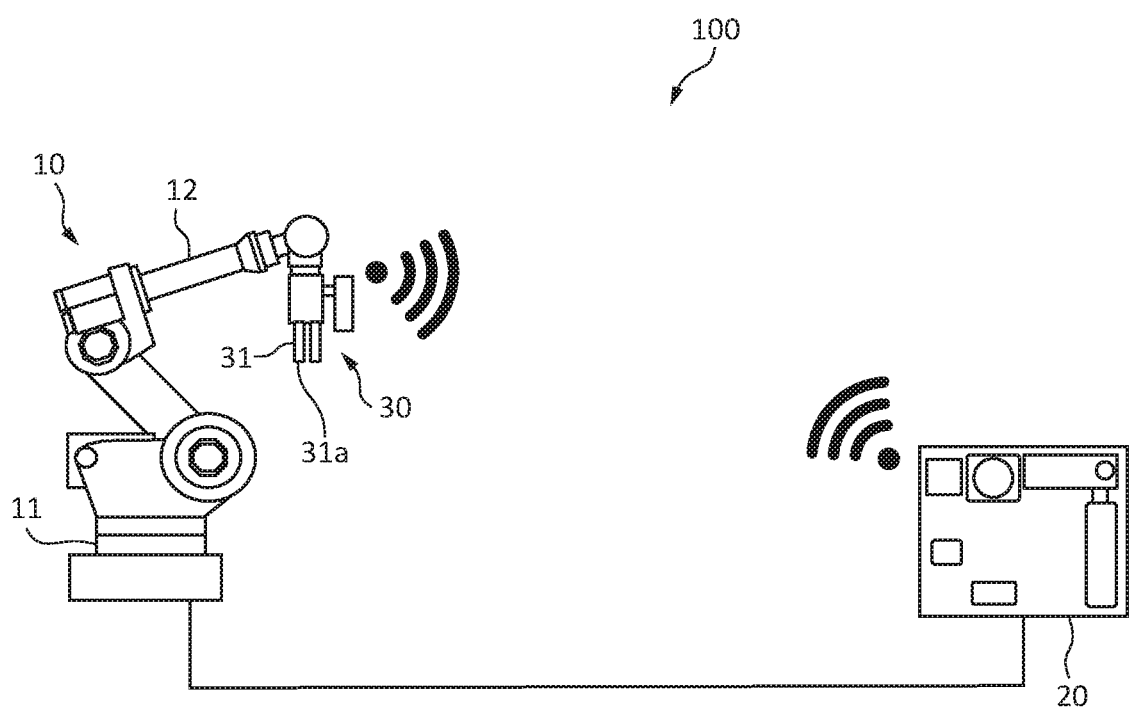
FIG. 1 is a view showing the entire structure of a robot system including a robot controller according to a first embodiment.

The embodiments of the present disclosure will be described below with reference to the attached drawings. In the drawings, corresponding constituent elements have been assigned common reference signs. In order to facilitate understanding, the scales of the drawings have been appropriately modified. Furthermore, the forms illustrated in the drawings are merely one example for carrying out the present invention. The present invention is not limited to the illustrated forms.

Figure 2:
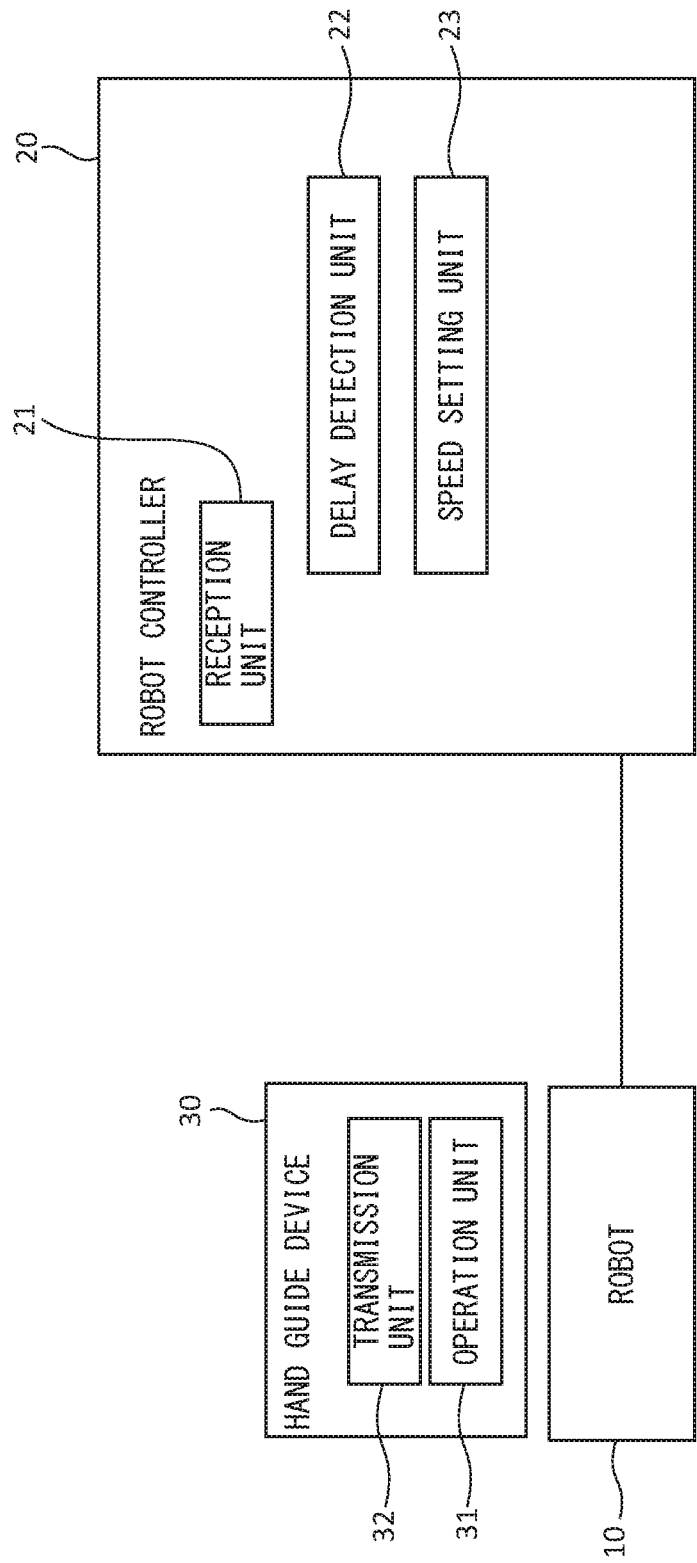
FIG. 2 is a functional block diagram of the robot controller.

FIG. 1 is a view showing the entire structure of a robot system 100 including a robot controller 20 according to an embodiment. FIG. 2 is a functional block diagram of the robot controller 20. As shown in FIG. 1, the robot system 100 comprises a robot 10, a robot controller 20 for controlling the robot 10, and a hand guide device 30 as an operation input device for operating the robot 10. In the present embodiment, the robot 10 is a vertical articulated robot and including a base 11 fixed to an installation floor, and an arm 12 formed of a plurality of joints and link members. Note that other types of robots may be used as the robot 10. The hand guide device 30 is attached to a predetermined movable part (the tip of the arm in the present embodiment) of the robot 10.

The hand guide device 30 comprises an operation unit 31 including an operation lever 31a, an emergency stop switch (not illustrated), etc., and a transmission unit 32 which transmits, by wireless communication, transmission data containing an operation command input via the operation unit 31. The robot controller 20 moves the robot 10 in accordance with the operation command received from the hand guide device 30 by wireless communication. The wireless communication between the hand guide device 30 and the robot controller 20 may be based on a predetermined wireless communication standard such as, for example, wireless LAN. The robot controller 20 may be configured as a conventional computer including a CPU, ROM, RAM, a storage device, an operation unit, a network interface, etc.

An operator (not illustrated) operates the robot 10 using the hand guide device 30 to perform a teaching operation. For example, the operator moves the predetermined movable part (the tip of the arm in the present embodiment) of the robot 10 in a desired direction by tilting the operation level 31a. In a system in which wireless communication is used, such as the robot system 100, the communication situation may be degraded by the influence of the surrounding environment in some cases. When the communication situation is degraded, a situation may occur in which the transmission data from the hand guide device 30 is delayed, and the robot controller 20 cannot receive the transmission data for a certain period of time. When such a situation occurs, as described below, the robot controller 20 appropriately controls the speed of the robot 10 from the viewpoint of suppressing a decrease in the efficiency of the entire teaching operation while ensuring safety.

As shown in FIG. 2, the robot controller 20 comprises a reception unit 21, a delay detection unit 22, and a speed setting unit 23. The reception unit 21 receives, by wireless communication, transmission data containing an operation command from the hand guide device 30. The delay detection unit 22 detects a delay of the transmission data from an expected arrival time. When a delay of arrival of the transmission data is detected by the delay detection unit 22, the speed setting unit 23 sets the movement speed when the robot 10 moves in accordance with the operation command to a 2nd speed which is less than a 1st speed set when a delay is not detected and which is greater than zero. Note that though the robot controller 20 is configured to directly receive wireless signals from the hand guide device 30 in the configuration example shown in FIG. 1, the robot controller 20 may be configured to receive transmission data from the hand guide device 30 via a device having a wireless communication function, such as an externally connected teach pendant.

Figure 3:
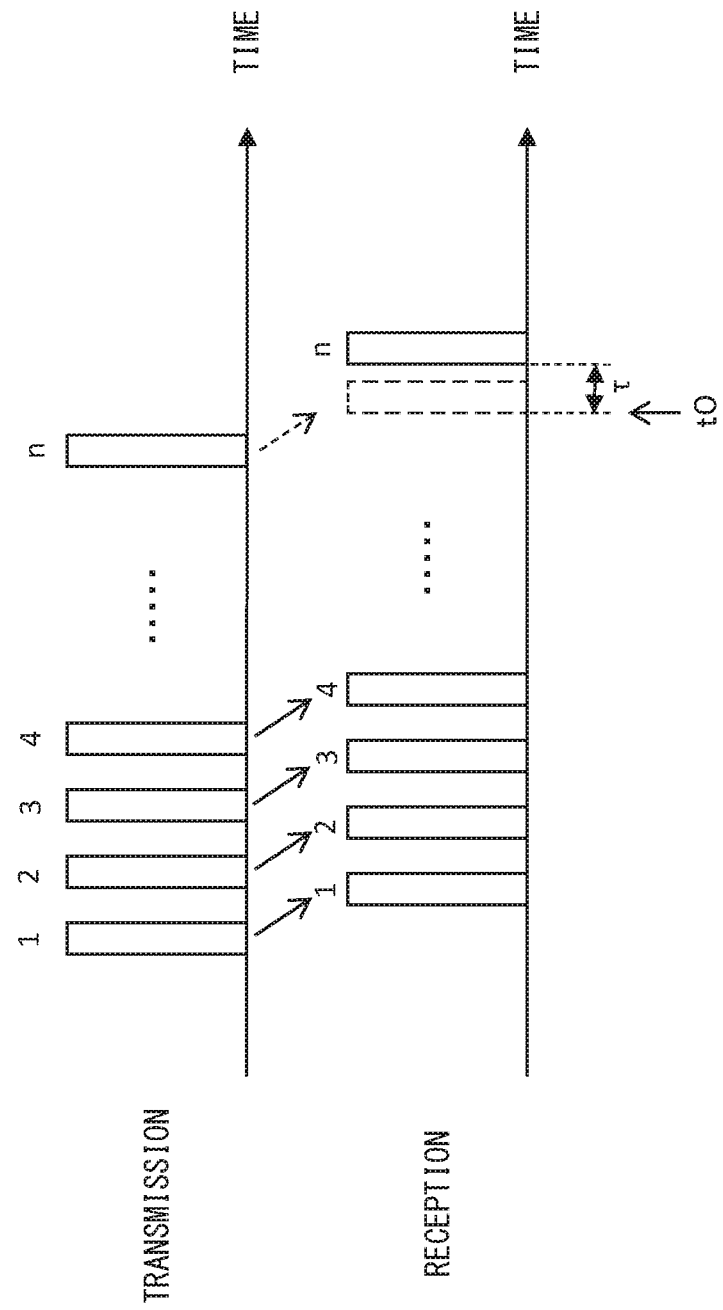
FIG. 3 is a view showing a first example of a transmission data delay detection operation by a delay detection unit.

FIG. 3 is a view showing a first example of a transmission data delay detection operation by the delay detection unit 22. In general, the hand guide device 30 continuously transmits operation commands (for example, commands to move in the positive X-axis direction in the robot coordinate system) at constant cycles while the operation lever 31a is tilted in the desired direction by the operator. The upper part of FIG. 3 shows the timing at which the transmission unit 32 continuously and periodically transmits the transmission data while the operation lever 31a is tilted. It is assumed herein that an ID (1, 2, 3, 4, . . . n) indicating the order of transmission is added to the transmission data. The case in which the transmission data cycle is known by the robot controller 20 will be assumed. The lower part of FIG. 3 shows the timing at which the reception unit 21 receives the transmission data (1, 2, 3, 4, . . . n). In this case, the delay detection unit 22 counts the internal clock signals using, as a trigger, the timing at which the first transmission data is received, and thereby obtains a scheduled arrival time at which the second and subsequent transmission data arrive. Then, the delay detection unit 22 determines whether or not a delay of each transmission data from the scheduled arrival time has occurred. For example, it is assumed that the n-th transmission data arrives with a delay of time $\tau$ from the scheduled arrival time t0. In this case, the delay detection unit 22 detects that a delay of time $\tau$ has occurred in the n-th transmission data.

Figure 4:
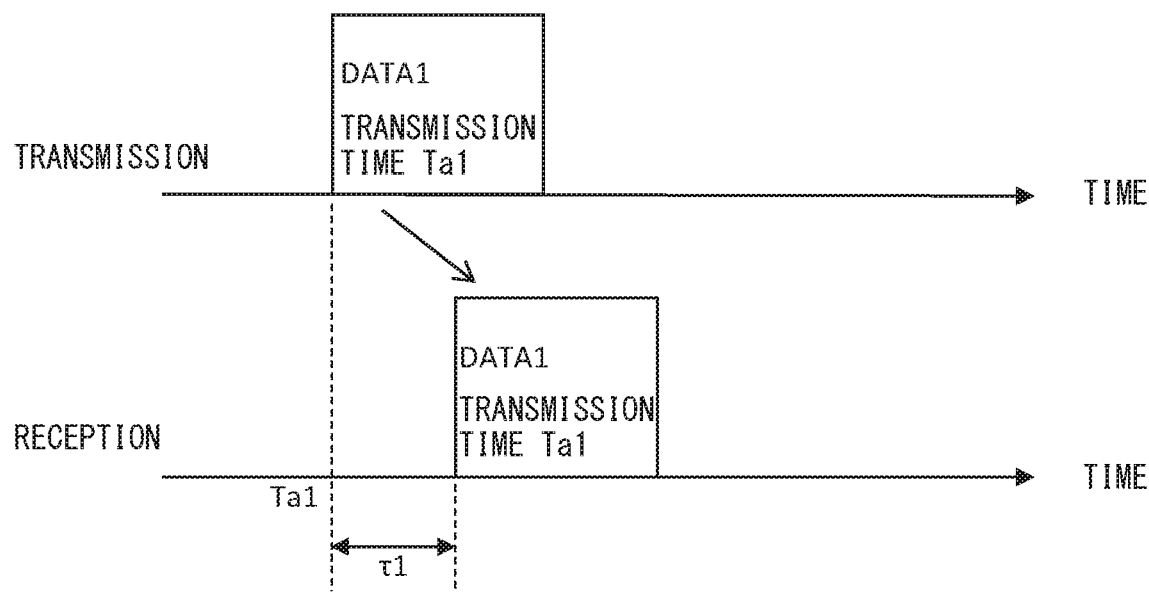
FIG. 4 is a view showing a second example of a transmission data delay detection operation by the delay detection unit.

FIG. 4 is a view showing a second example of a transmission data delay detection operation by the delay detection unit 22. In the second example, the transmission unit 32 of the hand guide device 30 adds a transmission time to the transmission data and transmits the transmission data. In the case of the second example, using, for example, a time matching function via a network, the times of internal clocks of the hand guide device 30 and the robot controller 20 are set to be identical in advance. As shown in FIG. 4, the transmission unit 32 of the hand guide device 30 adds a transmission time Ta1 to the transmission data (DATA1) and transmits the transmission data. When the reception unit 21 of the robot controller 20 receives the transmission data (DATA1), the delay detection unit 22 determines, by referencing the time of the internal clock, that the transmission data (DATA1) has arrived after time t1 from the transmission time Ta1. As an example, the delay detection unit 22 sets, as the scheduled arrival time of the transmission data (DATA1), the time obtained by adding a transmission delay time normally required for transmission of a wireless signal to the transmission time Ta1. The delay detection unit 22 detects that a delay has occurred for the transmission data (DATA1) when the arrival time of the transmission data (DATA1) has passed the scheduled arrival time in this case, the delay time of the transmission data (DATA1) can be determined by $\tau$1—(transmission delay time).

When the delay detection unit 22 detects a delay of the transmission data by the delay detection operation illustrated in FIG. 3 or FIG. 4, the speed setting unit 23 sets the movement speed of the robot 10, which is moved in the direction commanded by the operation command, to the 2nd speed, which is less than the 1st speed set when there is no transmission data delay and which is greater than zero. It should be noted that the 1st speed and 2nd speed as referred to herein may be set as a target movement speed or a maximum movement speed in the control of the speed of the robot 10. Examples of the set value of the 2nd speed are as described below.

(Setting Example 1) A predetermined speed that is low enough to maintain safety, even if the robot (predetermined movable part) comes into contact with a person.

(Setting Example 2) A speed at which, when the predetermined movable part of the robot is decelerated from the 2nd speed at a predetermined deceleration, the predetermined movable part can stop within a first predetermined distance from the position at which deceleration at the predetermined deceleration starts. The first predetermined distance in this case is a distance (for example, 30 cm) which is generally ensured between the hand guide device 30 and the operator when the robot 10 is operated while the operator is holding the hand guide device 30. By setting the 2nd speed to such a value, in the case in which the wireless communication situation is degraded, a situation in which the robot 10 comes into contact with the operator can be avoided.

(Setting Example 3) A speed at which, when the predetermined movable part of the robot is decelerated from the 2nd speed at a predetermined deceleration, the predetermined movable part can stop within a range of a second predetermined distance from a reference position set on the base 11 as the fixed part of the robot 10. By setting the 2nd speed to such a value, when the wireless communication situation degrades, it is possible to avoid a situation in which the predetermined movable part of the robot 10 deviates from the range of the second predetermined distance from the reference position, thereby ensuring safety. In this case, the speed setting unit 23 may continuously update the 2nd speed based on the current position of the predetermined movable part of the robot, for example, every time transmission data is received and delay is detected.

Figure 8:
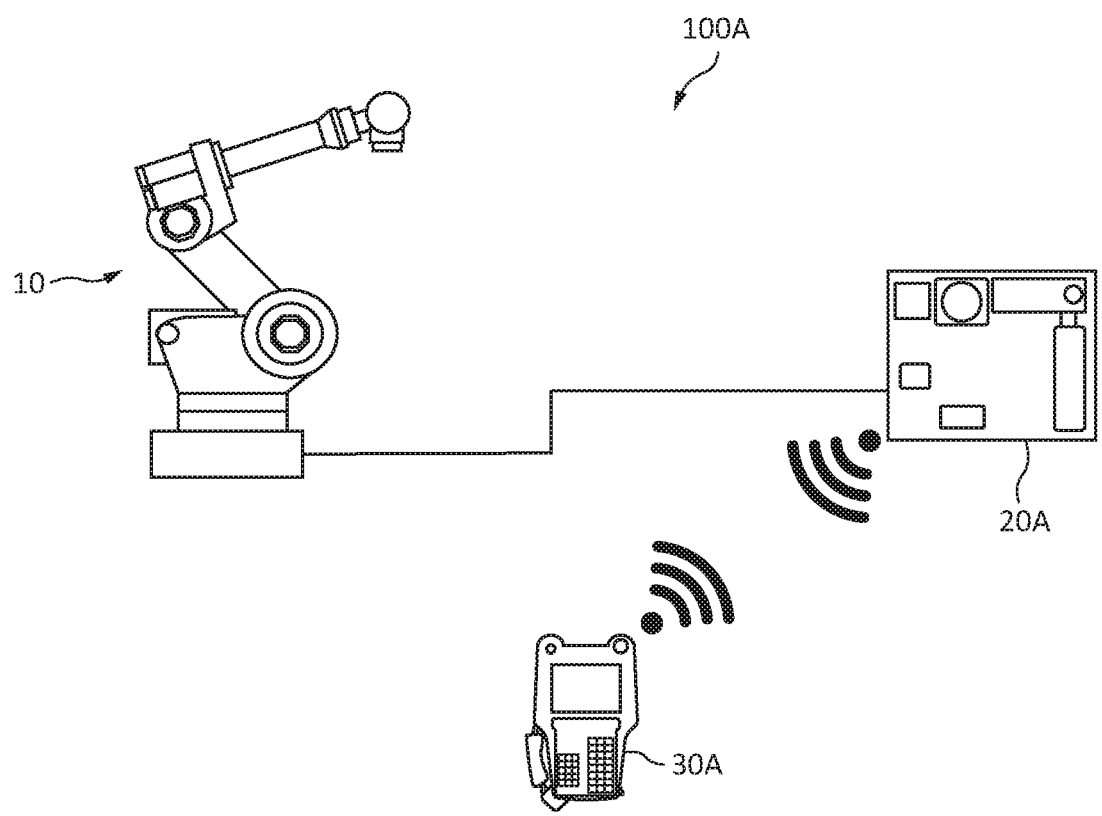
FIG. 8 is a view showing the entire structure of a robot system when the operation input device is a teach pendant.

The setting example 3 of the 2nd speed can be more appropriately used when the operation input device is a teach pendant 30A which is wirelessly connected to the robot controller 20, as shown in a structural example in FIG. 8. A robot system 100A shown in FIG. 8 comprises the robot 10, a robot controller 20A for controlling the robot 10, and the teach pendant 30A which is wirelessly connected to the robot controller 20A. The teach pendant 30A includes an operation unit including jog operation keys for operating the robot 10, and a transmission unit for transmitting transmission data containing the operation commands input via the operation unit to the robot controller 20A by wireless communication. In the case of such a system structure, the operator operates the robot 10 using the teach pendant 30A at a position located a certain distance from the robot 10.

Figure 5:
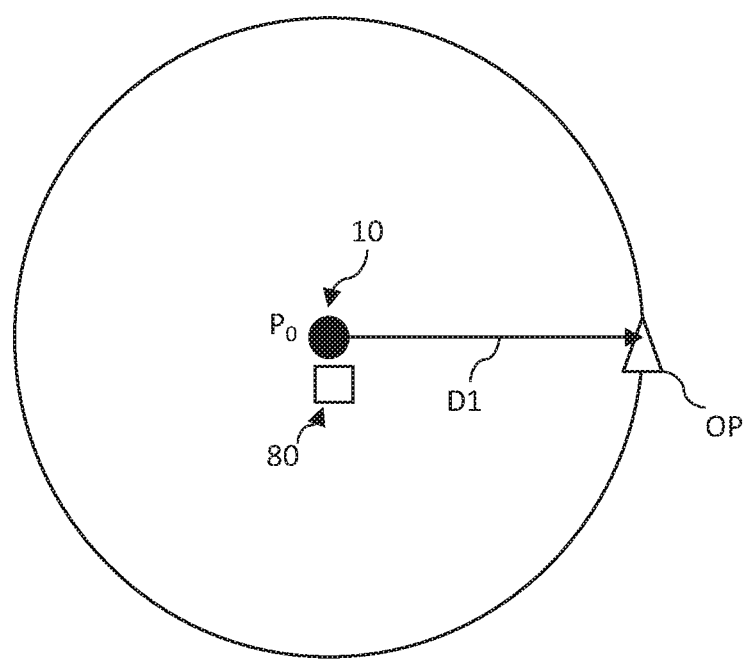
FIG. 5 is a view schematically illustrating the positional relationship between a robot and an operator in a horizontal plane.

FIG. 5 is a view schematically illustrating the positional relationship in a horizontal direction between the robot 10 and an operator OP when a system such as the robot system 100A is used. As shown in FIG. 5, when the operator OP performs work in a position a distance $D_1$ from a reference position $P_0$ set on the base 11 of the robot 10, the second predetermined distance in the setting example 3 of the 2nd speed described above can be set to a value equal to or less than the distance $D_1$. For example, it is assumed that the predetermined movable part of the robot 10 moves radially outward with respect to the reference position $P_0$, and the distance between the predetermined movable part and the outer edge of the range of the second predetermined distance is $D_0$. Furthermore, it is assumed that the predetermined movable part is decelerated at a constant deceleration $A_0$. In this case, the speed setting unit 23 may set the 2nd speed to a value equal to or less than $(2D_0A_0)^{1/2}$, which is the speed at which the predetermined movable part can be stopped within the distance $D_0$ when decelerating at the deceleration $A_0$.

Furthermore, as shown in FIG. 5, the robot system 100A may comprise a distance sensor 80 for measuring the distance between the reference position $P_0$ and the operator OP. The distance sensor 80, as an example, is fixed to the base 11 of the robot 10, and is connected by, for example, a wire to the robot controller 20A. The distance sensor 80 provides the robot controller 20A with the measured distance to the operator OP. In this case, in a situation in which the position of the operator OP changes, the position of the operator OP can be detected and the second predetermined distance can be set. For example, a laser sensor, laser scanner, etc., which can acquire three-dimensional point group data of an object within a predetermined measurement range can be used as the distance sensor 80. In order to obtain the shortest distance to an object (or person) around the robot 10, a plurality of distance sensors 80 may be arranged on the base 11 of the robot 10.

Figure 6:
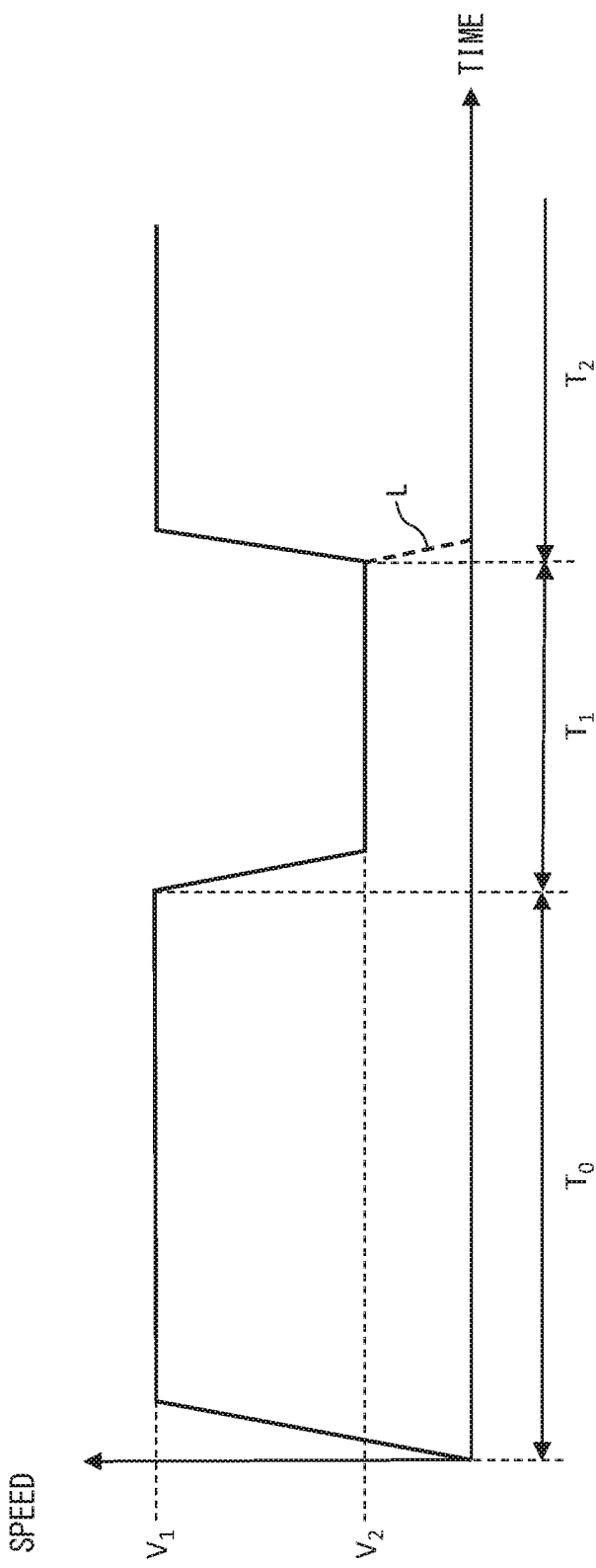
FIG. 6 is a graph showing an example of the change of the speed of a robot (predetermined movable part) according to a speed set by a speed setting unit.

FIG. 6 is a graph showing an example of the change of the speed of the robot 10 (predetermined movable part) in accordance with the speed setting operation by the speed setting unit 23. In FIG. 6, the horizontal axis represents time and the vertical axis represents speed. It is assumed that at the start time point (time zero) on the time axis of FIG. 6, the operator operates the operation lever 31a by tilting the operation lever 31a in a desired direction by a predetermined amount, and this state is maintained. Thus, the hand guide device 30 continues to periodically transmit transmission data including a predetermined operation command (for example, a command to move in the positive direction along the X-axis) over the entire time axis of the graph of FIG. 6. The time period $T_0$ on the time axis of FIG. 6 is a time period in which the wireless communication situation is suitable, the time period $T_1$ is a time period in which the wireless communication situation is degraded, and the time period $T_2$ is a time period in which the wireless communication situation again returns to a suitable state. In the time period $T_0$, since no delay of the transmission data occurs, the robot controller 20 accelerates the robot 10 (predetermined movable part) to the 1st speed $V_1$ corresponding to the operation command and moves the robot 10 at the 1st speed $V_1$.

Next, when the wireless communication situation enters the degraded time period $T_1$, delay of the transmission data is detected by the delay detection unit 22, and the speed setting unit 23 sets the movement speed of the robot 10 (predetermined movable part) to the 2nd speed $V_2$, which is slower than the 1st speed $V_1$. Since the transmission data continues to arrive at the robot controller 20 with a predetermined delay time during the time period $T_1$, the speed setting unit 23 continues the operation for setting the movement speed to the 2nd speed. Thus, in the time period $T_1$, the robot 10 (predetermined movable part) gradually decelerates from the 1st speed $V_1$, and continues to move in the specified direction at the 2nd speed $V_2$.

Next, when the communication situation enters the restored time period $T_2$, delay of the transmission data is not detected, and the speed setting unit 23 returns the setting of the movement speed of the robot 10 (predetermined movable part) to the 1st speed $V_1$. As a result, the robot 10 (predetermined movable part) accelerates to the 1st speed $V_1$ and continues to move at the 1st speed $V_1$. Note that when the 2nd speed is set in accordance with Setting Example 3, the robot controller 20 may decelerate the robot 10 (predetermined movable part) at the maximum deceleration and stop the robot 10 (predetermined movable part), as indicated by the dashed line L in FIG. 6, when the robot 10 (predetermined movable part) approaches the periphery of the range of the second predetermined distance to prevent the robot 10 (predetermined movable part) from deviating from the range of the second predetermined distance. By performing control in this manner, the periphery of the range of the second predetermined distance can be set as a virtual fence defining a moveable range of the robot 10 that acts when the wireless communication situation degrades.

Figure 7:
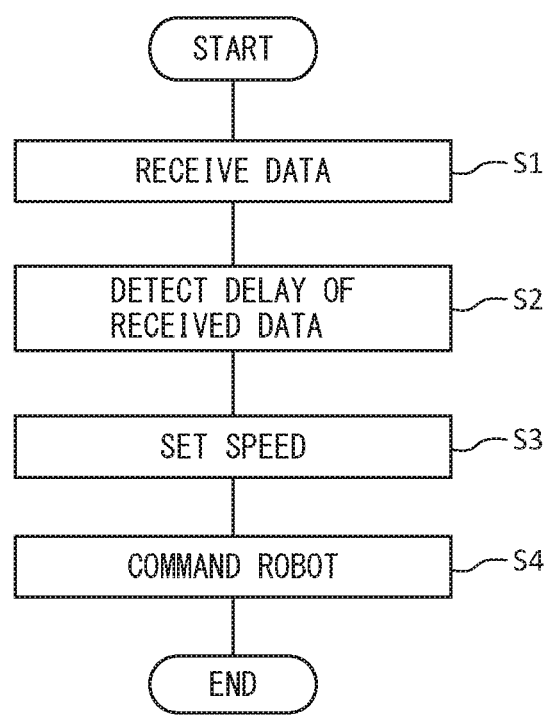
FIG. 7 is a flowchart showing a robot control method in relation to movement speed.

FIG. 7 is a flowchart illustrating a robot control method relating to the movement speed described above. The process of FIG. 7 is executed under the control of the CPU of the robot controller 20. As shown in FIG. 7, when the robot controller 20 receives the transmission data (step S1), delay of the received transmission data is detected in accordance with the method illustrated with reference to FIG. 3 or FIG. 4 (step S2). When a delay of the transmission data from the scheduled arrival time is detected, the robot controller 20 sets the movement speed of the robot 10 (predetermined movable part) to the 2nd speed in accordance with the method of any of Setting Examples 1 to 3 described above (step S3). When a delay of the transmission data is not detected, the robot controller 20 sets the speed setting of the robot 10 (predetermined movable part) to the 1st speed, which is the normal speed. When the movement speed is set, the robot controller 20 moves the robot in accordance with the operation command and the set movement speed (step S4).

According to the present embodiment described above, even when the wireless communication situation has degraded, it is possible to suppress a decrease in the efficiency of the entire teaching operation while ensuring safety.

Though the embodiments of the present disclosure have been described above, a person skilled in the art would understand that various modifications and changes can be made without deviating from the scope disclosed in the claims described below.

The robot system configuration examples shown in FIGS. 1 and 8 are merely exemplary, and the present in can be applied to various types of robot systems in which an operation input device and a robot controller are connected by wireless communication.

The program for executing the process (FIG. 7) of the robot control method illustrated in the embodiments described above can be recorded on any of various computer-readable recording media (for example, a semiconductor memory such as a ROM, EEPROM, and flash memory, magnetic recording media, and optical disks such as CD-ROMs and DVD-ROMs).

The invention claimed is:

1. A robot controller for controlling a robot, the robot controller comprising:
  a reception unit configured to receive, by wireless communication, a plurality of pieces of transmission data respectively containing a same operation commands for the robot, the plurality of pieces of transmission data being output continuously at constant cycles from a hand guide device mounted on the robot when an operation lever of the hand guide device is tilted in a particular direction by a particular amount,
  a delay detection unit configured to determine a delay in receiving each of the plurality of pieces of transmission data from a scheduled arrival time, wherein the delay occurs when an arrival time of one or more of the plurality of pieces of transmission data is longer than the scheduled arrival time, and
  a speed setting unit configured to set, when the delay is determined, a new movement speed of the robot having been moved in accordance with a previously received operation command of the operation commands to a second speed which is a predetermined set speed less than a first speed of the previous operation command set when no delay is determined and which is greater than zero, wherein the new movement speed during the delay in receiving the plurality of pieces of transmission data is a gradual deceleration in speed of the robot from the first speed when no delay is determined to the predetermined set speed of the second speed.

2. The robot controller according to claim 1, wherein the speed setting unit sets the second speed to the new movement speed at which, when a predetermined movable part of the robot is decelerated from the second speed at a predetermined deceleration, the predetermined movable part can stop within a first predetermined distance from a position at which deceleration at the predetermined deceleration started.

3. The robot controller according to claim 1, wherein the speed setting unit sets the second speed so that, when a predetermined movable part of the robot has decelerated from the second speed at a predetermined deceleration, the predetermined movable part can stop within a range of a second predetermined distance from a reference position set on a fixed part of the robot.

4. A robot system, comprising:
  a robot;
  an operation input device including an operation unit configured to operate the robot, and a transmission unit configured to transmit, by wireless communication, transmission data containing operation commands input via the operation unit, wherein the transmission unit transmits a plurality of pieces of transmission data respectively containing a same operation commands for the robot continuously at constant cycles when an operation lever of the operation unit is tilted in a particular direction by a particular amount; and
  a robot controller comprising:
    a reception unit configured to receive, by the wireless communication, the plurality of pieces of transmission data respectively containing the same operation commands for the robot,
    a delay detection unit configured to determine a delay in receiving each of the plurality of pieces of transmission data from a scheduled arrival time, wherein the delay occurs when an arrival time of one or more of the plurality of pieces of transmission data is longer than the scheduled arrival time, and
    a speed setting unit configured to set, when the delay is determined, a new movement speed of the robot having been moved in accordance with a previously received operation command of the transmitted operation commands to a second speed which is a predetermined set speed less than a first speed of the previously received operation command set when no delay is determined and which is greater than zero, wherein the new movement speed during the delay in receiving the plurality of pieces of transmission data is a gradual deceleration in speed of the robot from the first speed when no delay is determined to the predetermined set speed of the second speed.

5. The robot system according to claim 4, wherein the operation input device is a hand guide device mounted on a predetermined movable part of the robot.

6. A method for controlling a robot, comprising:
  receiving, by wireless communication, a plurality of pieces of transmission data respectively containing a same operation commands for movement of the robot, the plurality of pieces of transmission data being output continuously at constant cycles from a hand guide device mounted on the robot when an operation lever of the hand guide device is tilted in a particular direction by a particular amount,
  determining a delay in receiving each of the plurality of pieces of transmission data from a scheduled arrival time, wherein the delay occurs when an arrival time of one or more of the plurality of pieces of transmission data is longer than the scheduled arrival time, and
  setting, when the delay is determined, a new movement speed of the robot which is moved in accordance with a previously received operation command to a second speed which is a predetermined set speed less than a first speed of the previously received operation command set when no delay is determined and which is greater than zero, wherein the new movement speed during the delay in receiving the plurality of pieces of transmission data is a gradual deceleration in speed of the robot from the first speed when no delay is determined to the predetermined set speed of the second speed.

* * * * *